(12) United States Patent
Boschi et al.

(10) Patent No.: US 10,949,203 B2
(45) Date of Patent: Mar. 16, 2021

(54) TECHNOLOGIES FOR ENSURING FUNCTIONAL SAFETY OF AN ELECTRONIC DEVICE

(71) Applicant: Intel Corporation, Santa Clara, CA (US)

(72) Inventors: Gabriele Boschi, Lucca (IT); Alessandro Campinoti, Pisa (IT)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/458,018

(22) Filed: Jun. 29, 2019

(65) Prior Publication Data
US 2019/0324751 A1 Oct. 24, 2019

(51) Int. Cl.
*G06F 9/30* (2018.01)
*G06F 9/54* (2006.01)
*G06F 9/50* (2006.01)

(52) U.S. Cl.
CPC ........ *G06F 9/30101* (2013.01); *G06F 9/3012* (2013.01); *G06F 9/5011* (2013.01); *G06F 9/542* (2013.01)

(58) Field of Classification Search
CPC .............. G06F 11/1641; G06F 9/3961; G06F 9/30101; G06F 9/542; G06F 9/3012; G06F 9/5011; G06F 11/1675; G06F 11/1658; G06F 11/1637; G06F 9/3891; G06F 9/3861
See application file for complete search history.

(56) References Cited

U.S. PATENT DOCUMENTS

| | | | | |
|---|---|---|---|---|
| 5,493,497 A * | 2/1996 | Buus | .................... | G05D 1/0077 701/4 |
| 2002/0152427 A1* | 10/2002 | Ok | ...................... | G06F 11/3636 714/34 |
| 2005/0105348 A1* | 5/2005 | Tanaka | ...................... | G06F 1/24 365/200 |
| 2009/0177866 A1* | 7/2009 | Choate | ................ | G06F 11/1687 712/200 |
| 2014/0344619 A1* | 11/2014 | Kwon | ................... | G06F 9/3851 714/11 |

* cited by examiner

*Primary Examiner* — Farley Abad
(74) *Attorney, Agent, or Firm* — Alliance IP, LLC

(57) ABSTRACT

Technologies for ensuring functional safety of an electronic device include receiving data by a primary and secondary hardware unit and performing a function on the data. Each of the primary and secondary hardware unit perform the same function on their respective set of data to generate corresponding results. A determination is made whether the hardware units are synchronized and the results can be compared. If so, the results are compared and an alert is generated if the results do not match.

22 Claims, 5 Drawing Sheets

TECHNOLOGIES FOR ENSURING FUNCTIONAL SAFETY OF AN ELECTRONIC DEVICE

BACKGROUND

In certain applications, implementation of functional safety of electronic systems is an important consideration. To do so, various techniques may be used to ensure the electronic system is operating in a proper and/or predictable manner. One such technique used to ensure functional safety of an electronic device or system is known as hardware redundancy. In a hardware redundancy system, an electrical component (e.g., a processor core or other electrical device or circuit) is duplicated. For example, two identical or otherwise similar processor cores may be established on the same silicon die. Both electrical components are configured to operate in the same manner in a lock-step fashion. For example, two processor cores may execute the same code in parallel on the same set of data. To ensure the primary electrical component is operating correctly, the output of both electrical components are compared and an error is generated if those outputs do not match. In this way, the operation of the primary electrical component is verified based on the operation of the duplicated electrical component.

Traditional hardware redundancy, however, requires that the primary electrical component and the redundant electrical component are synchronized to ensure the operation of each electrical component is temporally consistent. Typically, such synchronization requires the resetting of both electrical components, or portions of those components (e.g., the resetting of certain flip-flops included in the electrical components). Loss of synchronization may be indicative of a failure of a component of the electronic device or system and may result in loss of data, as well as a lack of verification of the proper operation of the primary electrical component. Of course, loss of synchronization even without a known cause or reason may be considered a bug in the design. As such, should synchronization between the primary and redundant electrical component become lost, a reboot or resetting of the components is required. The loss of synchronization between the components can occur for many different reasons, some of which are unrelated to the core safety concern. As such, the ability to quickly re-synchronize the electrical components is beneficial in systems requiring functional safety.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
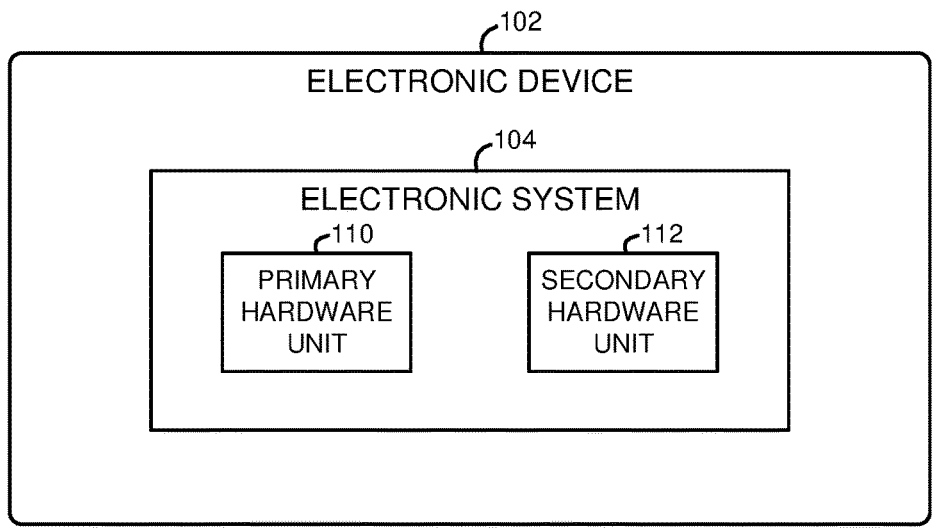
FIG. 1 is a simplified block diagram of at least one embodiment of an electronic device having an electronic system that includes hardware redundancy to ensure functional safety of a hardware unit of the electronic system.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative electronic device 102 includes an electronic system having hardware redundancy to ensure functional safety of the electronic device 102. To do so, the electronic system 104 includes redundant hardware units, illustratively shown as a primary hardware unit 110 and a secondary hardware unit 112. Of course, the electronic system 104 may include additional redundant hardware units and/or other mechanisms to ensure safety and proper operation in other embodiments. As discussed in more detail below, the secondary hardware unit 112 is used to validate the operation of the primary hardware unit 110. However, unlike typical hardware redundancy techniques, the secondary hardware unit 112 is controllable to ensure synchronicity with the primary hardware unit 110 before the validation is performed. That is, the secondary hardware unit 112 is controllable to synchronize with the primary hardware unit 110 on-the-fly. In this way, the requirement to reboot or reset the primary hardware unit 110 may be reduced (e.g., during situations in which the hardware units 110, 112 have become unsynchronized due to safety and/or non-safety related circumstances).

The electronic device 102 may be embodied as any type of electronic device having one or more electrical components or circuits including, but not limited to, a computer, a controller, a microcontroller, a desktop computer, a laptop computer, a tablet computer, a mobile compute device, a mobile communication device, an in-vehicle computer, an industrial controller, a programmable logic controller, a server, a network appliance, a compute device, a data storage device, a communication routing device, or other computer, controller, or similar electronic device. Similarly, the electronic system 104 may be embodied as any electrical component, device, circuit or collection of electrical components, devices, or circuits having an electrical hardware unit (e.g., a sub-component) for which hardware redundancy is desired. For example, the electric system 104 may be embodied as a processor, a processor circuit, a collection of processor circuits or components, a microcontroller, an integrated circuit, an embedded system, a field-programmable-array (FPGA), an application specific integrated circuit (ASIC), a system-on-a-chip, an accelerator, a data storage controller, a network communication controller, a collection of logical circuits or components, or any other electronic device, circuit, or collection thereof.

Each hardware unit 110, 112 may be embodied as any type of electrical component or sub-component of the electronic system 104. For example, in some embodiments the hardware units 110, 112 may be embodied as defined electronic components, such as a processor cores or other computational electronic devices, which may form hardware components of a larger system (e.g., of a system-on-a chip) and, as such, may be included on a common chip or in a common package. In other embodiments, the hardware units 110, 112 may be embodied electrical circuits or a collection of electrical circuits or components. Although only one secondary hardware unit 112 is shown in FIG. 1, it should be appreciated that the electronic system 104 may include additional secondary hardware units 112 in other embodiments for additional redundancy, as well as other safety mechanisms and/or devices. In some embodiments, the hardware units 110, 112 are physically identical or otherwise similar. However, in other embodiments, the hardware units 110, 112 may be physically diverse but execute or otherwise operate in a similar manner. Additionally, each hardware unit 110, 112 is configured or programmed in a similar manner such that each hardware unit 110, 112 behaves similarly during normal operation. For example, as discussed in more detail below, each hardware unit 110, 112 may perform one or more identical functions on data stored in the hardware unit, and the results of those functions may be compared to ensure proper operation of the primary hardware unit 110 (e.g., to ensure the data stored by the primary hardware unit 110 and/or the function performed by the primary hardware unit 110 is accurate). As discussed in more detail below, such comparison may be performed in a controlled or selective manner depending on the particular implementation. For example, the comparison may be performed periodically (e.g., on every clock cycle) or responsively (e.g., in response to a determination of data validity or function logic validity) as discussed in more detail below.

Figure 2:
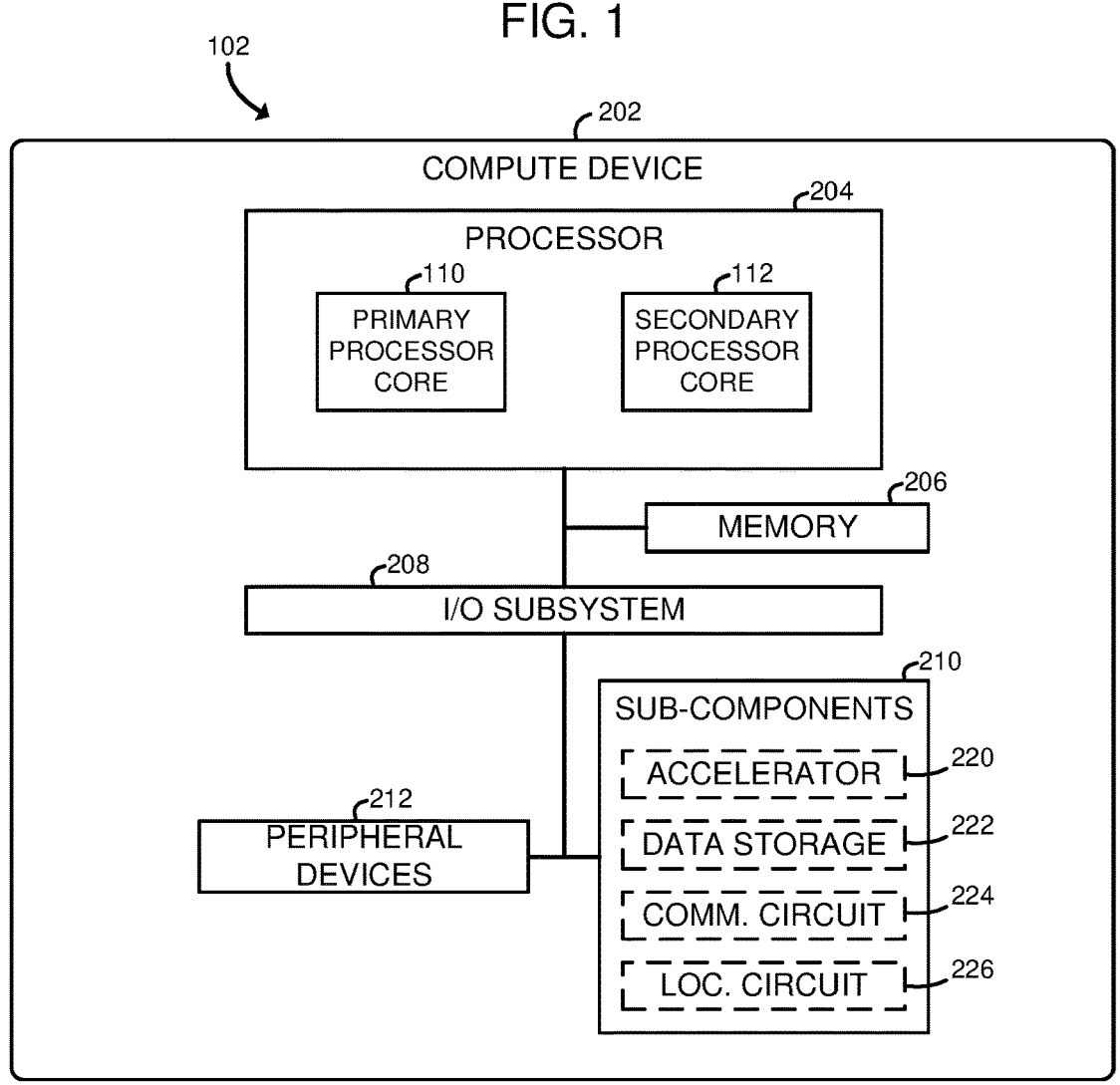
FIG. 2 is a simplified block diagram of at least one embodiment of a compute device including hardware redundancy of a processor core.

Referring now to FIG. 2, in an illustrative embodiment, the electronic device 102 is embodied as a compute device 202, the electronic system 104 is embodied as a processor 204 of the compute device 202, and the hardware units 110, 112 are embodied as a primary processor core 110 and a secondary processor core 112 of the processor 204, respectively. The compute device 202 may be embodied as any type of computer, server, computational machine, or other computer. The processor 204 may be embodied as any type of processor capable of performing the functions described herein. For example, the processor 204 may be embodied as a multi-core processor(s), a digital signal processor, a microcontroller, an embedded system, a field-programmable-array (FPGA), an application specific integrated circuit (ASIC), a system-on-a-chip, or other processor or processing/controlling circuit.

The illustrative compute device 202 also includes a memory 206, an input/output ("I/O") subsystem 208, one or more sub-components 210, and one or more peripheral devices 212. The memory 206 may be embodied as any type of volatile or non-volatile memory or data storage capable of performing the functions described herein. The processor 204 and memory 206 are communicatively coupled to other components of the compute device 102 via the I/O subsystem 208, which may be embodied as circuitry and/or components to facilitate input/output operations with processor 204 and memory 206 and other component of the compute device 202. For example, the I/O subsystem 208 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 208 may be incorporated, along with the processor 204, the memory 206, and other components of the compute device 204, into single silicon die or package.

The sub-components 210 may include any type of additional electronic component or device depending on the particular type, functionality, and/or intended use of the compute device 202. For example, in some embodiments, the sub-components 210 may include an accelerator 220, a data storage 222, a communication circuit 224, a location circuit 226, and/or any other type of electronic device, circuit, or component. The accelerator 220 may be embodied as any type of electrical device or circuitry configured to perform particular computation functions at an improved efficiency relative to the processor 204. For example, the accelerator 220 may be embodied as a graphics processing unit (GPU) or a FPGA specially programmed to perform certain mathematical functions on data. The data storage 222 may be embodied as any type of device or devices configured for short-term or long-term storage of data such as, for example, memory devices and circuits, memory cards, hard disk drives, solid-state drives, or other data storage devices. The communication circuit 224 may be embodied as any type of communication circuit, device, or collection thereof, capable of enabling communications between the compute device 202 and other devices. For example, the communication circuit 224 may be embodied as a network interface controller (NIC) or the like. In use, the communication circuit 224 may be configured to use any one or more communication technologies (e.g., wireless or wired communications) and associated protocols (e.g., Ethernet, Bluetooth®, WiFi®, WiMAX, LTE, 5G, etc.) to effect such communication. The location circuit 226 may be embodied as any type of circuit, device, or collection thereof, capable of generating data indicative of the present position of the compute device 202, such as a global positioning system (GPS) circuit.

Additionally, in some embodiments, the compute device 202 may include one or more peripheral devices 212. Such peripheral devices 212 may include any type of peripheral device commonly found in a compute device such as audio input devices, a display, other input/output devices, interface devices, and/or other peripheral devices.

It should be appreciated that although the primary and secondary hardware units 110, 112 are illustratively shown in FIG. 2 as forming part of the processor 204, any one or more of the sub-components 210 of the compute device 202 may include similar hardware redundancy in place of or in addition to the processor 204. That is, any of the sub-components 210 may be embodied as an electronic system 104 described herein. For example, in some embodiments, the accelerator 220, the data storage 222, the communication circuit 224, the location circuit 226, and/or other sub-component 210 may include a primary hardware unit 110 and a secondary hardware unit 112 (e.g., processing devices or circuits) to ensure proper operation of the corresponding primary hardware unit 110 as discussed in detail below. In this way, the compute device 202 may include hardware redundancy in multiple components of the compute device 202 to ensure functional safety of the compute device 202.

Figure 3:
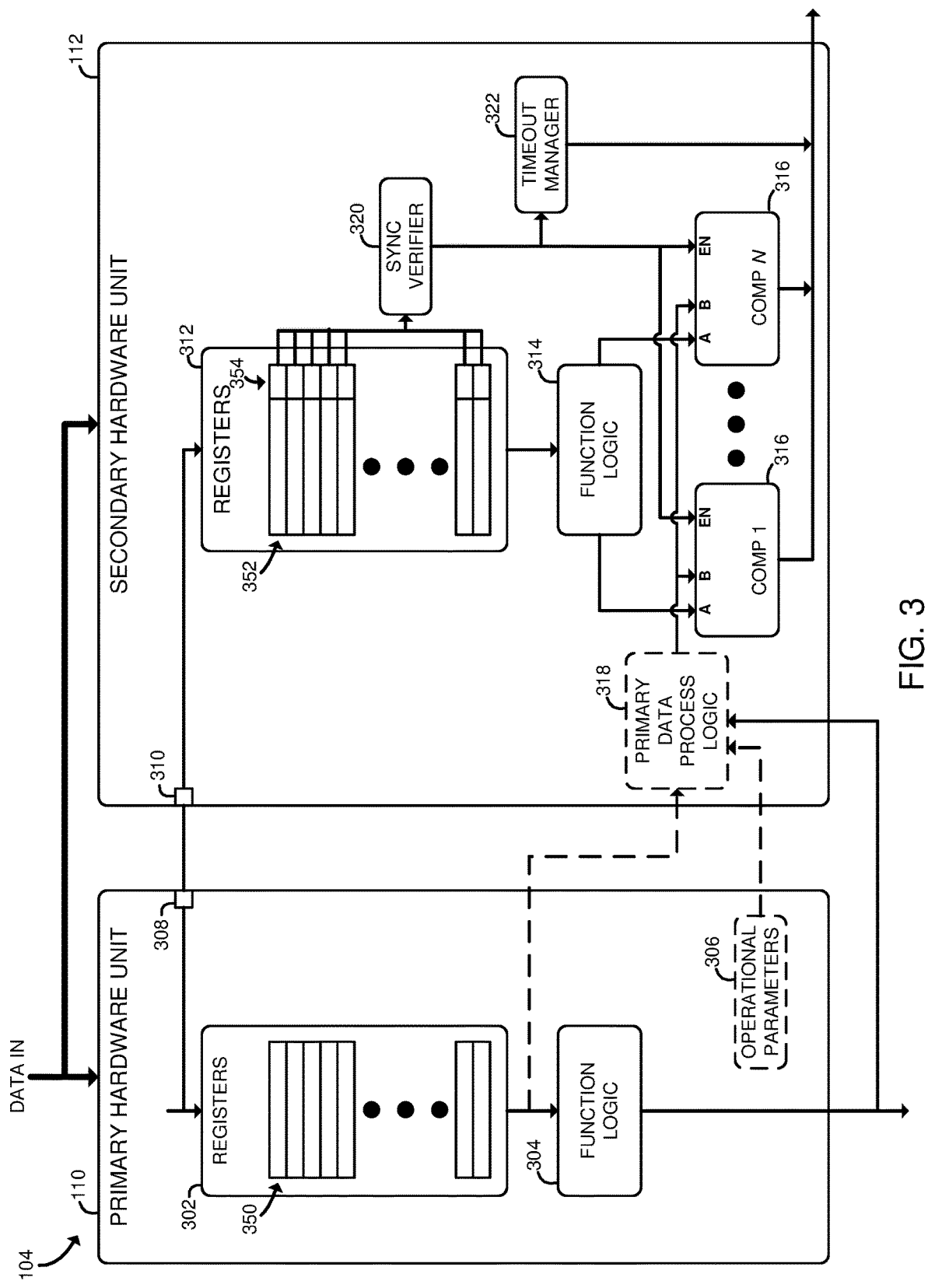
FIG. 3 is a simplified block diagram of one embodiment of the electronic system of the electronic device of FIG. 1 including a primary hardware unit and a redundant secondary hardware unit to ensure functional safety of the electronic system.

Referring now to FIG. 3, the illustrative electronic system 104 includes the primary hardware unit 110 and the secondary hardware unit 112 as discussed above. As shown, the primary hardware unit 110 includes a set 302 of data registers 350 and functional logic 304. The set 302 of data registers 350 may be embodied as any type of storage device capable of storing data received by, or generated by, the primary hardware unit 110. In the illustrative embodiment, the data registers 350 are embodied as memory registers local to the primary hardware unit 110. For example, the data registers 350 may be embodied as memory registers of a memory located on the processor 204 of FIG. 2 and local to the primary processor core 110.

As described in more detail below, the primary hardware unit 110 receives data via a data bus or other data input. The received data may or may not be processed, conditioned, or otherwise modified. In any case, the data is subsequently written to the set 302 of registers 350 of the primary hardware unit 110. The written data is also passed to the secondary hardware unit via a port 308 of the primary hardware unit 110 and a corresponding port 310 of the secondary hardware unit 112. In this way, data written to the registers 350 is duplicated to the registers 352.

The functional logic 304 may be embodied as any type of electrical device(s), component(s), and/or circuit(s) configured to perform a corresponding function using the data stored in the set 302 of data registers 350 to produce a particular result. For example, the functional logic 304 may be embodied as fixed or programmable logic (e.g., an arithmetic logic unit (ALU)) to perform the corresponding function. The particular function performed by the functional logic 304 may be embodied as any type of function, algorithm, computation, program, or other data manipulation capable of being performed using the data stored in the data registers 302. For example, the function may be embodied as a mathematical function or other data processing scheme.

The secondary hardware unit 112 includes a corresponding set 312 of registers 352 and functional logic 314. Similar to the set 302 of data registers 350, the set 312 of registers 352 may be embodied as any type of storage device capable of storing data received by the secondary hardware unit 112. In the illustrative embodiment, the data registers 352 are embodied as memory registers local to the secondary hardware unit 112 (e.g., memory registers of a memory located on the processor 204 of FIG. 2 and local to the secondary processor core 112). As described in more detail below, the secondary hardware unit 112 is configured to store data received from the primary hardware unit via the port 310 into the set 312 of registers 352. Because the data received by the secondary hardware unit 112 is the same as the data received by the primary hardware unit 110, each hardware unit 110, 112 stores the same data in their respective sets 302, 352 of data registers.

As shown in FIG. 3, each of the data registers 352 includes a validity field 354, which is used to track the synchronicity of the corresponding data register 352 with a corresponding data register 350 of the set 302 of data registers 350 of the primary hardware unit 110. To do so, as discussed in more detail below, each validity field 354 is initialized to a reset value (e.g., a null value) upon reset of the secondary hardware unit (or selectively) and subsequently updated to a reference value in response to the corresponding data register 352 having data written thereto. In this way, the validity field 354 indicates whether the corresponding data register 352 contains fresh, valid data. In some embodiments, a synchronization procedure may be performed after reset of the secondary hardware unit 112, the primary hardware unit 110, and/or loss of sychronization. To do so, random or test data may be provided to the primary hardware unit 110 and secondary hardware unit 112 to cause population of the registers 350, 352 with the test data. The stored test data may then be compared as discussed in more detail below to confirm synchronization of the hardware units 110, 112. As such, the secondary hardware unit 112 can be re-synchronized with the primary hardware unit 110 at any time, and even during operation, by resetting the validity fields 354 (i.e., a reset of the primary hardware unit 110 and/or secondary hardware unit 112 may not be required).

Similar to the functional logic 304, the functional logic 314 may be embodied as any type of electrical devices, components, and or circuits configured to perform a corresponding function using the data stored in the set 312 of data registers 352 to produce a particular result. For example, the functional logic 314 may be embodied as fixed or programmable logic (e.g., an arithmetic logic unit (ALU)) to perform the corresponding function. The particular function performed by the functional logic 314 may be embodied as any type of function, algorithm, computation, program, or other data manipulation capable of being performed using the data stored in the data registers 312. For example, the function may be embodied as a mathematical function or other data processing scheme.

The secondary hardware unit 112 also includes one or more comparators 316, primary data process logic 318, a synchronicity verifier 320, and a timeout manager 322. Each of the comparators 316 may be embodied as any type of electrical device, component, circuitry, or other logic configured to compare the results of the function logics 304, 314 and generate an alert if those results do not match. The secondary hardware unit 112 may include any number of comparators 316, which may compare results of different functions performed by the function logics 304, 314. In embodiments including multiple comparators 316, each comparator 316 may be controlled independently to perform comparisons at different points in time in response to different criteria, for example. In the illustrative embodiment, each comparator 316 includes a first input (A) to receive the result of the function logic 314 of the secondary hardware unit 111 and a second input (B) to receive the result of the function logic 304 of the primary hardware unit 110.

In some embodiments, the secondary hardware unit 112 may also include the primary data process logic 318 configured to process the result of the function logic 304 prior to comparison of that result with the result of the function logic 314 by the comparator(s) 316. Additionally, in some embodiments, the primary data process logic 318 may utilize other data inputs to process the result of the function logic 314 including, for example, operational parameters 306 of the primary hardware unit 110 (e.g., clock speed, cache misses, etc.) and the pre-processed data retrieved from the data registers 350 of the primary hardware unit 110 as shown in FIG. 3 via dashed lines. The primary data process logic 318 may be embodied as any type of electrical devices, components, and or circuits configured process the result of the function logic 304. Such processing may include any type of processing to format or structure the result for comparison (e.g., reformatting to a particular address length, conversion of data structures, etc.)

The comparator(s) 316 are controllable to perform their respective comparison upon confirmation of synchronicity between the hardware units 110, 112. That is, each comparator 316 includes an enable input (EN), which must be set to cause the comparator 316 to perform the comparison of the results of the function logics 304, 314. The comparator enable signal is provided by the synchronization verifier 320. The synchronization verifier 320 may be embodied as any type of electrical device, component, and/or circuit configured to verify that each of the validity fields 354 of the set 312 of data registers 352 has been set to the reference value (i.e., is "valid'). To do so, the synchronization verifier 320 may be configured to compare the value stored in each validity field 354 to the reference value and determine that the corresponding data register 352 is valid if the validity field 354 is set to the reference value. If all validity fields 354 are determined to be valid, the synchronization verifier 320 is configured to generate an enable signal to the comparator(s) 316 to cause the comparator(s) 316 to perform the comparison of the results of the function logics 304, 314. If the comparator(s) 316 determines that the results of the function logics 304, 314 do not match, the comparator(s) 316 generates an alert signal as discussed below. The generation of the alert signal is an indication of a component failure detection (e.g., failure of the function logic 304, 314, the data registers 350, 352, etc.). The alert signal may further cause the resetting of the validity fields 354 and/or the resetting of the secondary hardware unit 112 in order to re-synchronize the primary and secondary hardware units 110, 112.

The timeout manager 322 may be embodied as any type of electrical device(s), component(s), and/or circuit(s) configured to ensure the secondary hardware unit 112 synchronizes with the primary hardware unit 110 within a reference period of time. To do so, the timeout manager 322 ensures all validity fields 354 are valid within the reference period of time. For example, the timeout manager 322 may monitor a timer, which is reset upon the reset of the validity fields 354 and/or the secondary hardware unit 112. If the timer reaches a reference elapsed time before all validity fields 354 are determined to be valid by the synchronization verifier 320, the timeout manager 322 is configured to generate an alert. As discussed above, the generation of the alert signal may cause the resetting of the validity fields 354 and/or the resetting of the secondary hardware unit 112 in order to re-synchronize the primary and secondary hardware units 110, 112.

Figure 4:
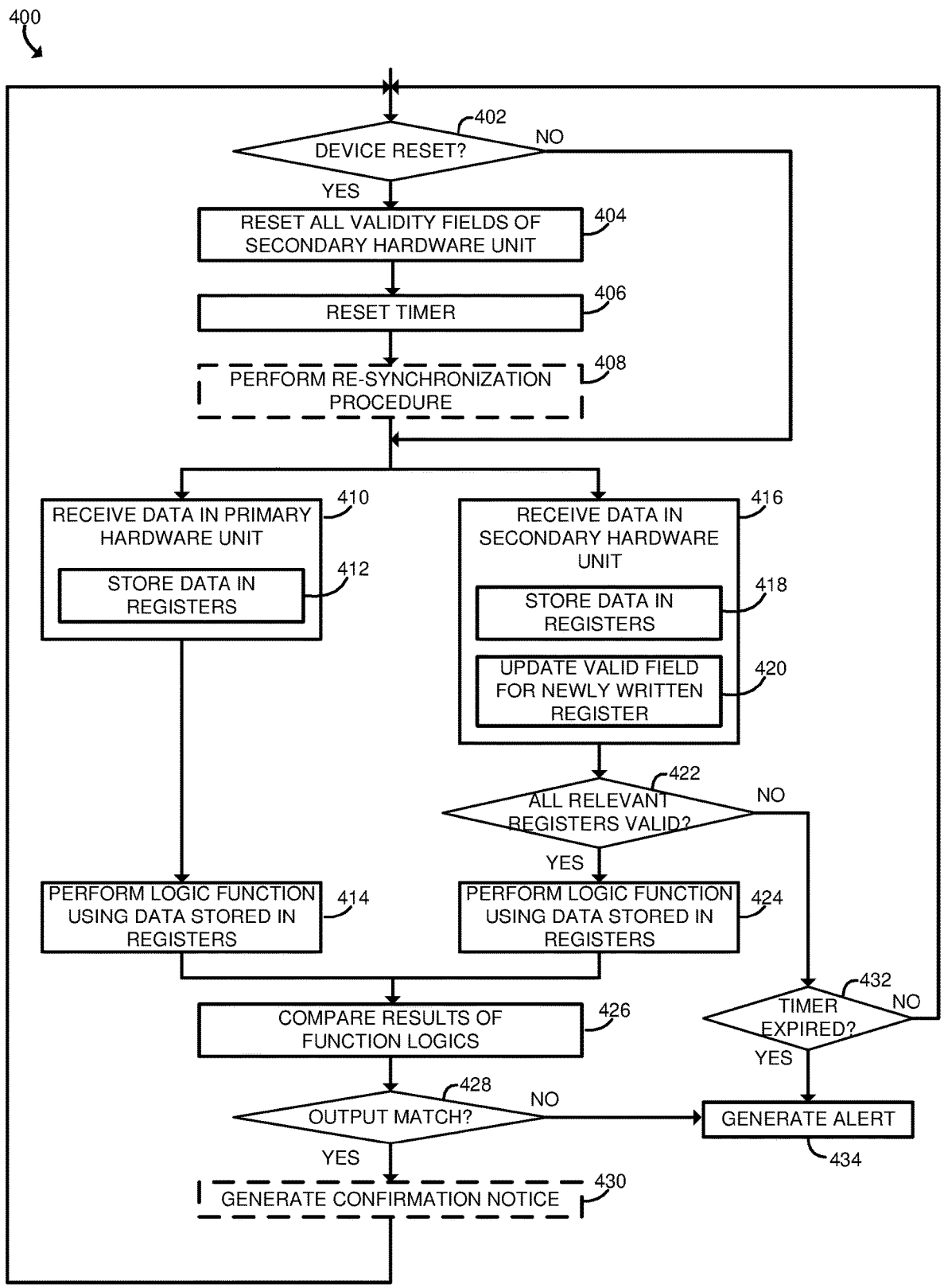
FIG. 4 is a simplified flow diagram of at least one embodiment of a method for ensuring functional safety, which may be executed by the electronic system of FIG. 3.

Referring now to FIG. 4, during operation, the electronic system 104 may execute a method 400 for ensuring functional safety of the electronic device 102. The method 400 begins with block 402 in which the electronic system 104 determines whether a reset has occurred. If so, the method 400 advances to block 404 in which all of the validity fields 354 of the set 312 of data registers 354 of the secondary hardware unit 112 are reset. For example, each validity field 354 may be reset to a null value to indicate that the corresponding data register 354 has old or invalid data stored therein (i.e., the particular data register is not synchronized with the corresponding data register 350 of the primary hardware unit 110). Additionally, in block 406, the timer of the timeout manager 322 is reset to zero or other initial value.

In some embodiments, in block 408, a re-synchronization procedure may be performed. To do so, random or test data is supplied to the primary hardware unit 110 and the secondary hardware unit 112 via the data bus. As discussed below in regard to blocks 410 and 416, each of the hardware units 110, 112 receive the test data and store the test data in their respective data registers 350, 352. In this way, the test data pre-populates the data registers 350, 352 to ensure synchronization of the hardware units 110, 112.

Subsequently, in block 410, the primary hardware unit 110 receives data on the data bus and stores the data, or a processed version thereof, in the set 302 of data registers 350 in block 412. Subsequently, in block 414, the function logic 304 of the primary hardware unit 110 may perform a corresponding function using the data stored in the data registers 350. It should be appreciated that the function logic 304 may perform the function in response to any corresponding condition or criteria (e.g., periodically or in response to a request for a result).

Contemporaneously, in block 416, the secondary hardware unit 112 receives the data from the primary hardware unit 110 via the ports 308, 310 and stores the received data in the set 312 of data registers 352 in block 418. Additionally, in block 420, the validity field 354 associated with each data register 352 to which data was written in block 418 is updated to the reference value to indicate that the corresponding data register 352 is valid. Subsequently, in block 422, the synchronization verifier 320 determines whether all relevant validity fields 354 for the corresponding function to be performed by the function logic 314 are valid (i.e., whether those validity fields 354 have been set to the reference value). If so, the method 400 advances to block 424 in which the function logic 314 of the secondary hardware unit 112 may perform a corresponding function using the data stored in the data registers 352. Similar to the function logic 314, the function logic 314 may perform the function in response to any corresponding condition or criteria (e.g., periodically or in response to a request for a result).

In block 426, the comparator 316 compares the results of the function logic 304 and the function logic 314. As discussed above, the result of the function logic 304 may be pre-processed by the primary data process logic 318 before such comparison. In block 428, the comparator 316 determines if the results match. If so, the method 400 advances to block 430 in which a confirmation notice is generated in some embodiments. Regardless, the method 400 subsequently loops back to block 402 in which the electronic system 104 again determines whether a reset has occurred. If, however, the comparator 316 determines the results do not match, the method 400 advances to block 434 in which an alert is generated. As discussed above, the generation of the alert is an indication of a component failure detection and may cause a reset of the validity fields 354, of the secondary hardware unit 112, and/or the primary hardware unit 110.

Referring back to block 422, if the synchronization verifier 320 determines that the relevant validity fields 354 for the corresponding function to be performed by the function logic 314 are not valid, the method 400 advances to block 432. In block 432, the timeout manager 322 determines whether the timer has expired (e.g., whether the timer matches a reference elapsed time). If not, the method 400 loops back loops back to block 402 in which the electronic system 104 again determines whether a reset has occurred. If, however, the timer has expired, the method 400 advances to block 434 in which an alert is generated. Again, as discussed above, the generation of the alert is an indication of a component failure detection and may cause a reset of the validity fields 354, of the secondary hardware unit 112, and/or the primary hardware unit 110.

Figure 5:
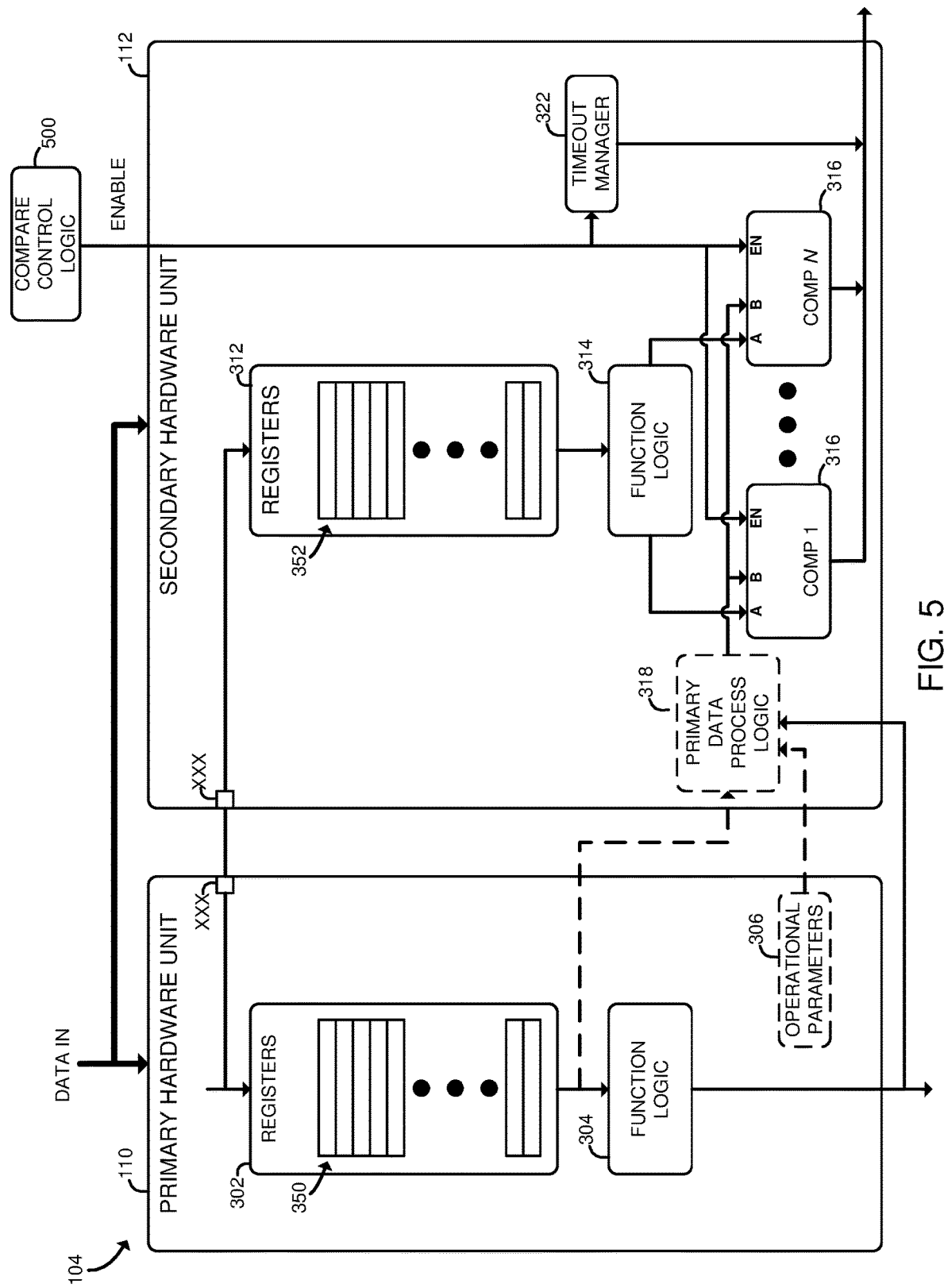
FIG. 5 is a simplified block diagram of another embodiment of the electronic system of the electronic device of FIG. 1 including a primary hardware unit and a redundant secondary hardware unit to ensure functional safety of the electronic system.

Referring now to FIG. 5, in another embodiment, the illustrative electronic system 104 includes the primary hardware unit 110 and the secondary hardware unit 112 as discussed above. As shown, the primary hardware unit 110 includes the set 302 of data registers 350 and the functional logic 304. As discussed above, the set 302 of data registers 350 may be embodied as any type of storage device capable of storing data received by the primary hardware unit 110. Additionally, as discussed above, the functional logic 304 may be embodied as any type of electrical devices, components, and or circuits configured to perform a corresponding function using the data stored in the set 302 of data registers 350 to produce a particular result.

The illustrative secondary hardware unit 112 includes the corresponding set 312 of registers 352 and the functional logic 314. As discussed above, the set 312 of registers 352 may be embodied as any type of storage device capable of storing data received by the secondary hardware unit 112. Because the secondary hardware unit 112 receives the data from the primary hardware unit 110 via the corresponding ports 308, 310, the data written to the set 312 of registers 352 should be identical to the data written to the set 302 of data registers 350.

However, unlike the embodiment of FIG. 3, the data registers 354 of the illustrative embodiment of FIG. 5 do not include the validity fields 354. As discussed in more detail below, the comparators 316 are controlled by a compare control logic 500, which does not rely on the validity fields 354 to determine synchronicity of the primary and secondary hardware units 110, 112.

As discussed above, the functional logic 314 may be embodied as any type of electrical device(s), component(s), and/or circuit(s) configured to perform the corresponding function using the data stored in the set 312 of data registers 352 to produce a particular result. Again, the particular function performed by the functional logic 314 may be embodied as any type of function, algorithm, computation, program, or other data manipulation capable of being performed using the data stored in the data registers 312.

As discussed above, each of the comparators 316 may be embodied as any type of electrical device(s), component(s), circuitry, or other logic configured to compare the results of the function logics 304, 314 and generate an alert if those results do not match. Again, the secondary hardware unit 112 may include any number of comparators 316, which may compare results of different functions performed by the function logics 304, 314. Each comparator a first input (A) to receive the result of the function logic 314 of the secondary hardware unit 112 and a second input (B) to receive the result of the function logic 304 of the primary hardware unit 110. In some embodiments, as discussed above, the secondary hardware unit 112 may also include the primary data process logic 318 configured to process the result of the function logic 304 prior to comparison of that result with the result of the function logic 314 by the comparator(s) 316.

As discussed above, the comparator(s) 316 are controllable to perform their respective comparison upon confirmation of synchronicity between the hardware units 110, 112. That is, each comparator 316 includes an enable input (EN), which must be set to cause the comparator to perform the comparison of the results of the function logics 304, 314. In the illustrative embodiment of FIG. 5, the comparator enable signal is provided by a compare control logic 500. The compare control logic 500 may embodied as any type of electrical device(s), component(s), and/or circuit(s) configured to determine whether and when to perform the comparison of the results of the function logics 314, 316. In the illustrative embodiment of FIG. 5, the compare control logic 500 is embodied as logic external to the secondary hardware unit 112. However, in other embodiments, the compare control logic 500 may form a portion of the secondary hardware unit 112.

The compare control logic 500 may determine whether the perform the comparison based on any suitable criteria. For example, in some embodiments, the compare control logic 500 is configured to determine whether to initiate the comparison based on an elapsed time since a reference point in time (e.g., an elapsed time since the last reset of the secondary hardware unit 112, an elapsed time since the last write to the data registers 352, an elapsed time since the last reset of the primary hardware unit 112, a total elapsed time, etc.). Additionally or alternatively, the compare control logic 500 is configured to determine whether to initiate the comparison based on an analysis of the data stored in the registers 352 of the secondary hardware unit 112 (e.g., based on a determination whether the data has changed since last read), based on a validity of the functional logics 304 and/or 304, based on an operational characteristic of the secondary hardware unit 112 and/or the primary hardware unit 110, and/or based on any other suitable analysis, data, or criteria.

If the compare control logic 500 determines to perform the comparison, the compare control logic generates an enable signal to the comparator(s) 316 to cause the comparator(s) 316 to perform the comparison of the results of the function logics 304, 314. If the comparator(s) 316 determine that the results of the function logics 304, 314 do not match, the comparator(s) 316 generate an alert signal as discussed below. The generation of the alert signal is an indication of a component failure detection, as discussed above, and may cause the resetting of the secondary hardware unit 112, the erasure of the data stored in the data registers 352, and/or other synchronization procedure to be performed in order to re-synchronize the primary and secondary hardware units 110, 112.

As discussed above, the timeout manager 322 may be embodied as any type of electrical device, component, and/or circuit configured to ensure the secondary hardware unit 112 synchronizes with the primary hardware unit 110 within a reference period of time. To do so, the timeout manager 322 ensures an enable signal has been issued by the compare control logic 500 within the reference period of time. For example, the timeout manager 322 may monitor a timer, which is reset upon the reset of the secondary hardware unit 112. If the timer reaches a reference elapsed time before receipt of an enable signal from the compare control logic 500, the timeout manager 322 is configured to generate an alert. As discussed above, the generation of the alert signal is an indication of a component failure detection and may cause the resetting of the secondary hardware unit 112, the erasure of the data stored in the data registers 352, and/or other synchronization procedure to be performed in order to re-synchronize the primary and secondary hardware units 110, 112.

Although the illustrative registers 352 of the secondary hardware unit 112 of FIG. 5 do not include the validity fields 354, the validity fields 354 may be included in other embodiments. In such embodiments, the validity fields may or may not be used by the compare control logic 500 to determine whether to perform the comparison of the results of the function logics 304, 314. However, even if not used to perform such a determination, the validity fields 354 may be used during a diagnostic or debug procedure performed in response to a determination of a mismatch between the results of the function logics 304, 314. For example, the validity fields may be used to facilitate the determination of a cause of the error.

Figure 6:
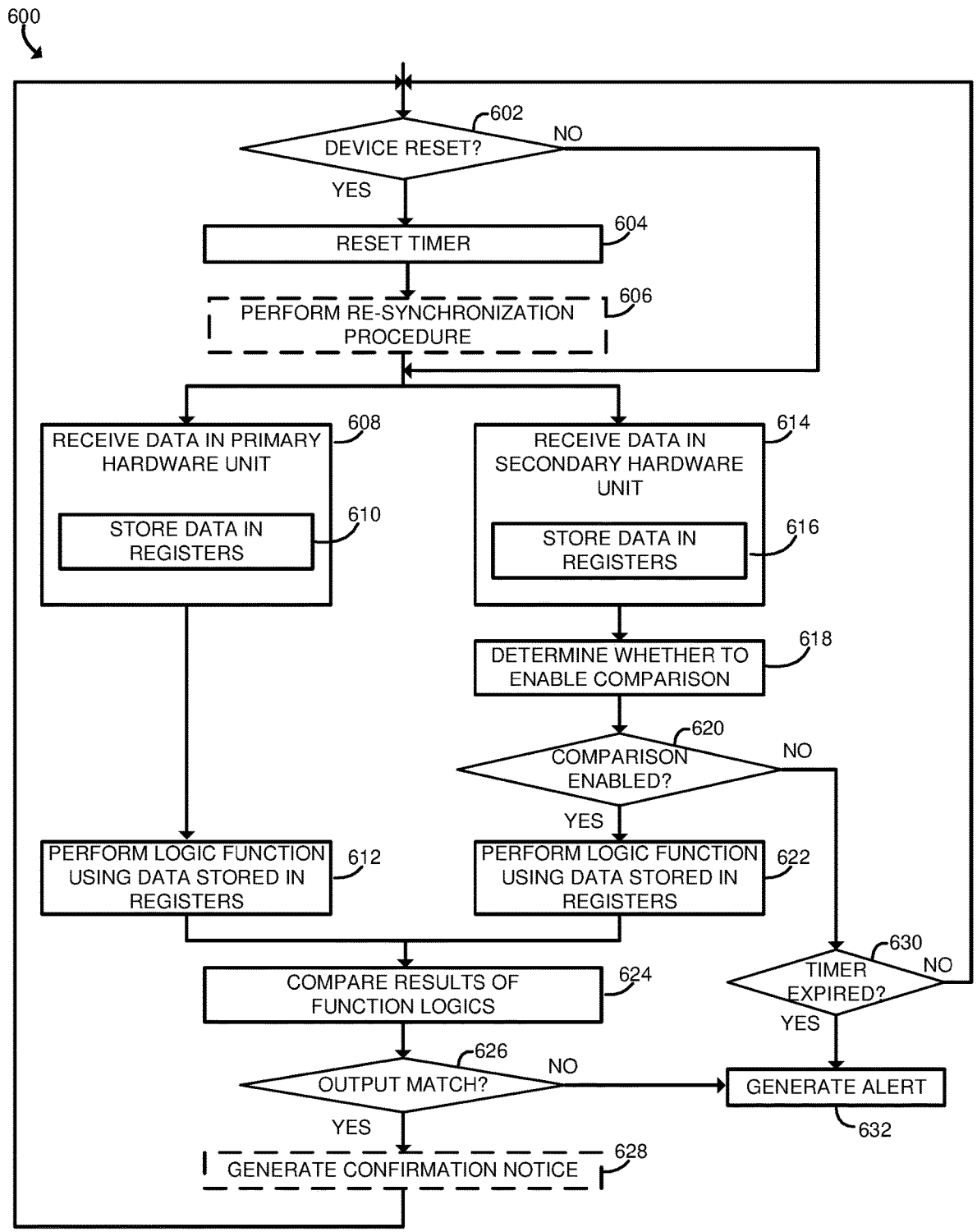
FIG. 6 is a simplified flow diagram of another embodiment of a method for ensuring functional safety, which may be executed by the electronic system of FIG. 5.

Referring now to FIG. 6, during operation, the electronic system 104 of FIG. 5 may execute a method 600 for ensuring functional safety of the electronic device 102. The method 600 begins with block 602 in which the electronic system 104 determines whether a reset has occurred. If so, the method 600 advances to block 604 in which the timer of the timeout manager 322 is reset to zero.

In some embodiments, in block 606, a re-synchronization procedure may be performed as discussed above. To do so, random or test data is supplied to the primary hardware unit 110 and the secondary hardware unit 112 via the data bus. As discussed below in regard to blocks 608 and 614, each of the hardware units 110, 112 receive the test data and store the test data in their respective data registers 350, 352. In this way, the test data pre-populates the data registers 350, 352 and such data can be compared to each other to confirm synchronization of the hardware units 110, 112.

Subsequently, in block 608, the primary hardware unit 110 receives data on the data bus and stores the data in the set 302 of data registers 350 in block 610. Subsequently, in block 612, the function logic 304 of the primary hardware unit 110 may perform a corresponding function using the data stored in the data registers 350. It should be appreciated that the function logic 304 may perform the function in response to any corresponding condition or criteria (e.g., periodically or in response to a request for a result).

Contemporaneously, in block 614, the secondary hardware unit 112 receives the data from the primary hardware unit 110 via the ports 308, 310 and stores the received data, or a processed version thereof, in the set 312 of data registers 352 in block 616. In block 618, the compare control logic 500 determines whether to perform the comparison of the results of the function logics 304, 314. To do so, as discussed above, the compare control logic 500 may utilize any suitable criteria. For example, the compare control logic 500 may determine whether to perform the comparison based on an elapsed time since a reference point in time (e.g., an elapsed time since the last reset of the secondary hardware unit 112, an elapsed time since the last write to the data registers 352, an elapsed time since the last reset of the primary hardware unit 112, a total elapsed time, etc.). Additionally or alternatively, the compare control logic 500 may determine whether to perform the comparison based on an analysis of the data stored in the registers 352 of the secondary hardware unit 112 (e.g., based on a determination whether the data has changed since last read), based on an operational characteristic of the secondary hardware unit 112 and/or the primary hardware unit 110, and/or based on any other suitable analysis, data, or criteria.

If, in block 620, the compare control logic 500 determines to enable the comparison, the method 600 advances to block 622 in which the function logic 314 of the secondary hardware unit 112 may perform a corresponding function using the data stored in the data registers 352. Similar to the function logic 314, the function logic 314 may perform the function in response to any corresponding condition or criteria (e.g., periodically or in response to a request for a result).

In block 624, the comparator 316 compares the results of the function logic 304 and the function logic 314. As discussed above, the result of the function logic 304 may be pre-processed by the primary data process logic 318 before such comparison. In block 626, the comparator 316 determines if the results match. If so, the method 600 advances to block 628 in which a confirmation notice is generated in some embodiments. Regardless, the method 600 subsequently loops back to block 602 in which the electronic system 104 again determines whether a reset has occurred. If, however, the comparator 316 determines the results do not match in block 626, the method 600 advances to block 632 in which an alert is generated. As discussed above, the generation of the alert may cause a reset of the secondary hardware unit 112 and/or the primary hardware unit 110.

Referring back to block 620, if the compare control logic 500 determines not to initiate the comparison of the results of the function logic 304, 314, the method 600 advances to block 630. In block 630, the timeout manager 322 determines whether the timer has expired (e.g., whether the timer matches a reference elapsed time). If not, the method 600 loops back to block 602 in which the electronic system 104 again determines whether a reset has occurred. If, however, the timer has expired, the method 600 advances to block 632 in which an alert is generated. Again, as discussed above, the generation of the alert may cause a reset of the secondary hardware unit 112 and/or the primary hardware unit 110 in some embodiments.

EXAMPLES

Illustrative examples of the technologies disclosed herein are provided below. An embodiment of the technologies may include any one or more, and any combination of, the examples described below.

Example 1 includes an electronic system for ensuring functional safety of an electronic device. The electronic system includes a primary hardware unit having a set of first data registers and a first function logic to perform a function using data stored in the set of first data registers to generate a first result and a secondary hardware unit having a set of second data registers, a second function logic to perform the function using data stored in the set of second data registers to generate a second result, and a comparator to compare the first result and the second result. The comparator is controllable to perform the comparison between the first result and the second result based on a determination to perform the comparison.

Example 2 includes the subject matter of Example 1, and further includes controller logic to determine whether to perform the comparison between the first result and the second result based on a criteria, the controller logic having an output connected to the comparator to provide an enable signal to an enable input of the comparator to cause the comparator to perform the comparison.

Example 3 includes the subject matter of Example 1 or 2, and wherein the controller logic is to determine whether to perform the comparison between the first result and the second result based on an elapsed time since the last reset of the secondary hardware unit.

Example 4 includes the subject matter of any of Examples 1-3, and wherein the controller logic is to determine whether to perform the comparison between the first result and the second result based on an analysis of data stored in the set of second data registers.

Example 5 includes the subject matter of any of Examples 1-4, and wherein the controller logic is to determine whether to perform the comparison between the first result and the second result based on an elapsed time since data was written to the second set of data registers.

Example 6 includes the subject matter of any of Examples 1-5, and further including a timeout manager to generate an alert in response to a determination that the comparator has not been enabled to perform the comparison within a reference time period since a reference point in time.

Example 7 includes the subject matter of any of Examples 1-6, and wherein the timeout manager is to compare a timer to the reference time period to determine whether the comparator has been enabled within the reference time period and wherein the timer is reset in response to a reset of the secondary hardware unit.

Example 8 includes the subject matter of any of Examples 1-7, and further including data process logic to process the first result received from the primary hardware unit prior to comparison of the first result to the second result by the comparator.

Example 9 includes the subject matter of any of Examples 1-8, and wherein the primary hardware unit is a first processor core of a processor and the secondary hardware unit is a second processor core of the processor.

Example 10 includes a method for ensuring functional safety of an electronic device. The method includes receiving data by a primary hardware unit of an electrical system of the electronic device; storing, by the primary hardware unit, the data in a set of first data registers of the primary hardware unit; receiving the data by a secondary hardware unit of the electrical system; storing, by the secondary hardware unit, the data in a set of second data registers of the secondary hardware unit; performing, by the primary hardware unit, a function using the data stored in the set of first data registers to generate a first result; performing, by the secondary hardware unit, the function using the data stored in the set of second data registers to generate a second result; determining whether to perform a comparison of the first result and the second result; and controlling, in response to a determination to perform the comparison, a comparator of the secondary hardware unit to perform the comparison of the first result and the second result.

Example 11 includes the subject matter of Example 10, and wherein determining whether to perform the comparison comprises determining, by controller logic, whether to perform the comparison based on a criteria and providing an enable signal to the comparator to cause the comparator to perform the comparison in response to a determination that the perform the comparison.

Example 12 includes the subject matter of Examples 10 or 11, and wherein determining whether to perform the comparison comprises determining whether to perform the comparison based on an elapsed time since a reference point in time.

Example 13 includes the subject matter of any of Examples 10-12, and wherein determining whether to perform the comparison comprises determining whether to perform the comparison based on an analysis of data stored in the set of second data registers.

Example 14 includes the subject matter of any of Examples 10-13, and wherein determining whether to perform the comparison comprises determining whether to perform the comparison based on an elapsed time since data was written to the second set of data registers.

Example 15 includes the subject matter of any of Examples 10-14, and further includes generating, by the secondary hardware unit, an alert in response to a determination that the comparator has not been enabled to perform the comparison within a reference time period since a last reset of the secondary hardware unit.

Example 16 includes the subject matter of any of Examples 10-15, and wherein generating the alert comprises comparing a timer to the reference time period to determine whether the comparator has been enabled within the reference time period, and further including resetting the timer in response to a reset of the secondary hardware unit.

Example 17 includes the subject matter of any of Examples 10-16, and further includes processing, by the secondary hardware unit, the first result received from the primary hardware unit prior to comparison of the first result to the second result by the comparator.

Example 18 includes one or more machine-readable storage media comprising a plurality of instructions stored thereon that, when executed, cause a secondary hardware unit of an electrical system of an electrical device to receive data from a data bus, wherein the data is also provided to a primary hardware unit of the electrical system; store the data in a set of data registers of the secondary hardware unit; receive, from the primary hardware unit, a first result generated by the primary hardware unit by performance of a function on the data stored in a set of data registers of the primary hardware unit; perform the function using the data stored in the set of data registers of the secondary hardware unit to generate a second result; determine whether to perform a comparison of the first result and the second result; and control, in response to a determination to perform the comparison, a comparator of the secondary hardware unit to perform the comparison of the first result and the second result.

Example 19 includes the subject matter of Example 18, and wherein to determine whether to perform the comparison comprises to determine whether to perform the comparison based on a criteria and to provide an enable signal to the comparator to cause the comparator to perform the comparison in response to a determination that the perform the comparison.

Example 20 includes the subject matter of Example 18 or 19, and wherein to determine whether to perform the comparison comprises to determine whether to perform the comparison based on an elapsed time since a reference point in time.

Example 21 includes the subject matter of any of Examples 18-20, and wherein to determine whether to perform the comparison comprises to determine whether to perform the comparison based on an analysis of data stored in the set of second data registers.

Example 22 includes the subject matter of any of Examples 18-21, and wherein to determine whether to perform the comparison comprises to determine whether to perform the comparison based on an elapsed time since data was written to the second set of data registers.

Example 23 includes the subject matter of any of Examples 18-22, and wherein the plurality of instructions, when executed, further cause the secondary hardware unit to generate an alert in response to a determination that the comparator has not been enabled to perform the comparison within a reference time period since a last reset of the secondary hardware unit.

Example 24 includes the subject matter of any of Examples 18-23, and wherein to generate the alert comprises to compare a timer to the reference time period to determine whether the comparator has been enabled within the reference time period, and wherein the plurality of instructions, when executed, further cause the secondary hardware unit to reset the timer in response to a reset of the secondary hardware unit.

Example 25 includes the subject matter of any of Examples 18-24, and wherein the plurality of instructions, when executed, further cause the secondary hardware unit to process the first result received from the primary hardware unit prior to comparison of the first result to the second result by the comparator.

The invention claimed is:

1. An electronic system for ensuring functional safety of an electronic device, the electronic system comprising:
    a primary hardware unit having a set of first data registers and a first function logic to perform a function using data stored in the set of first data registers to generate a first result;
    a secondary hardware unit having a set of second data registers, a second function logic to perform the function using data stored in the set of second data registers to generate a second result, and a comparator to compare the first result and the second result;
    a timeout manager to generate an alert indicating a component failure detection in response to a determination that the comparator has not been enabled to perform the comparison within a reference time period since a reference point in time,
    wherein the comparator is controllable to perform the comparison between the first result and the second result based on a determination to perform the comparison.

2. The electronic system of claim 1, further comprising controller logic to determine whether to perform the comparison between the first result and the second result based on a criteria, the controller logic having an output connected to the comparator to provide an enable signal to an enable input of the comparator to cause the comparator to perform the comparison.

3. The electronic system of claim 2, wherein the controller logic is to determine whether to perform the comparison between the first result and the second result based on an elapsed time since the last reset of the secondary hardware unit.

4. The electronic system of claim 2, wherein the controller logic is to determine whether to perform the comparison between the first result and the second result based on an analysis of data stored in the set of second data registers.

5. The electronic system of claim 4, wherein the controller logic is to determine whether to perform the comparison between the first result and the second result based on an elapsed time since data was written to the second set of data registers.

6. The electronic system of claim 1, wherein the timeout manager is to compare a timer to the reference time period to determine whether the comparator has been enabled within the reference time period and wherein the timer is reset in response to a reset of the secondary hardware unit.

7. The electronic system of claim 1, further comprising data process logic to process the first result received from the primary hardware unit prior to comparison of the first result to the second result by the comparator.

8. The electronic system of claim 1, wherein the primary hardware unit is a first processor core of a processor and the secondary hardware unit is a second processor core of the processor.

9. A method for ensuring functional safety of an electronic device, the method comprising:
    receiving data by a primary hardware unit of an electrical system of the electronic device;
    storing, by the primary hardware unit, the data in a set of first data registers of the primary hardware unit;
    receiving the data by a secondary hardware unit of the electrical system;
    storing, by the secondary hardware unit, the data in a set of second data registers of the secondary hardware unit;
    performing, by the primary hardware unit, a function using the data stored in the set of first data registers to generate a first result;
    performing, by the secondary hardware unit, the function using the data stored in the set of second data registers to generate a second result;
    determining whether to perform a comparison of the first result and the second result;
    controlling, in response to a determination to perform the comparison, a comparator of the secondary hardware unit to perform the comparison of the first result and the second result; and
    generating, in response to a determination that the comparator has not been enabled to perform the comparison within a reference time period since a reference point in time, an alert indicating a component failure detection.

10. The method of claim 9, wherein determining whether to perform the comparison comprises determining, by controller logic, whether to perform the comparison based on a criteria and providing an enable signal to the comparator to cause the comparator to perform the comparison in response to a determination that the perform the comparison.

11. The method of claim 10, wherein determining whether to perform the comparison comprises determining whether to perform the comparison based on an elapsed time since a reference point in time.

12. The method of claim 10, wherein determining whether to perform the comparison comprises determining whether to perform the comparison based on an analysis of data stored in the set of second data registers.

13. The method of claim 12, wherein determining whether to perform the comparison comprises determining whether to perform the comparison based on an elapsed time since data was written to the second set of data registers.

14. The method of claim 9, wherein generating the alert comprises comparing a timer to the reference time period to determine whether the comparator has been enabled within the reference time period,
and further comprising resetting the timer in response to a reset of the secondary hardware unit.

15. The method of claim 9, further comprising processing, by the secondary hardware unit, the first result received from the primary hardware unit prior to comparison of the first result to the second result by the comparator.

16. One or more non-transitory, machine-readable storage media comprising a plurality of instructions stored thereon that, when executed, cause a secondary hardware unit of an electrical system of an electrical device to:
receive data from a data bus, wherein the data is also provided to a primary hardware unit of the electrical system;
store the data in a set of data registers of the secondary hardware unit;
receive, from the primary hardware unit, a first result generated by the primary hardware unit by performance of a function on the data stored in a set of data registers of the primary hardware unit;
perform the function using the data stored in the set of data registers of the secondary hardware unit to generate a second result;
determine whether to perform a comparison of the first result and the second result;
control, in response to a determination to perform the comparison, a comparator of the secondary hardware unit to perform the comparison of the first result and the second result; and
generate, in response to a determination that the comparator has not been enabled to perform the comparison within a reference time period since a reference point in time, an alert indicating a component failure detection.

17. The one or more non-transitory, machine-readable storage media of claim 16, wherein to determine whether to perform the comparison comprises to determine whether to perform the comparison based on a criteria and to provide an enable signal to the comparator to cause the comparator to perform the comparison in response to a determination that the perform the comparison.

18. The one or more non-transitory, machine-readable storage media of claim 17, wherein to determine whether to perform the comparison comprises to determine whether to perform the comparison based on an elapsed time since a reference point in time.

19. The one or more non-transitory, machine-readable storage media of claim 17, wherein to determine whether to perform the comparison comprises to determine whether to perform the comparison based on an analysis of data stored in the set of second data registers.

20. The one or more non-transitory, machine-readable storage media of claim 19, wherein to determine whether to perform the comparison comprises to determine whether to perform the comparison based on an elapsed time since data was written to the second set of data registers.

21. The one or more non-transitory, machine-readable storage media of claim 16, wherein to generate the alert comprises to compare a timer to the reference time period to determine whether the comparator has been enabled within the reference time period,
wherein the plurality of instructions, when executed, further cause the secondary hardware unit to reset the timer in response to a reset of the secondary hardware unit.

22. The one or more non-transitory, machine-readable storage media of claim 16, wherein the plurality of instructions, when executed, further cause the secondary hardware unit to process the first result received from the primary hardware unit prior to comparison of the first result to the second result by the comparator.

* * * * *